R. M. SCHOPPERT.
FLASH LIGHT BATTERY TESTER.
APPLICATION FILED JAN. 30, 1919.
1,316,393.
Patented Sept. 16, 1919.
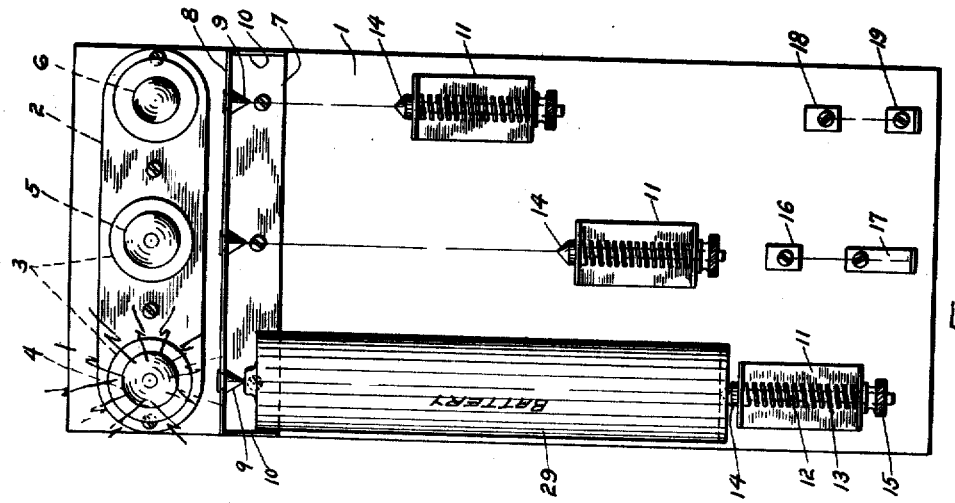
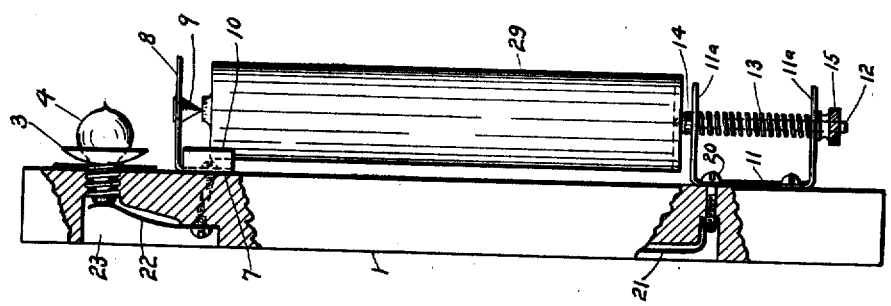
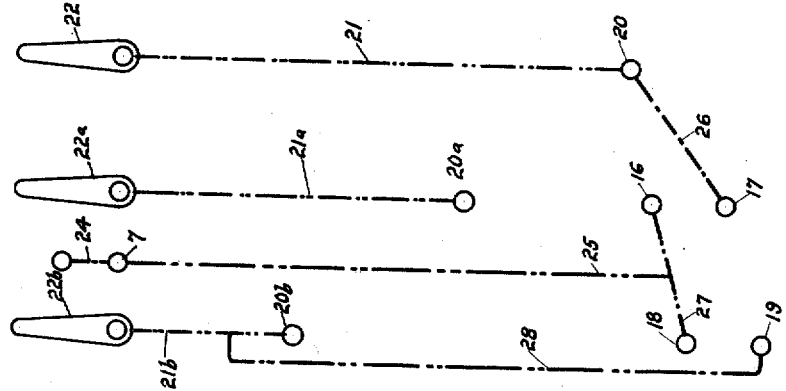
Witness
E. W. KING
Inventor
R. M. SCHOPPERT
By
Attorney

UNITED STATES PATENT OFFICE.

ROBERT M. SCHOPPERT, OF EUTAW, ALABAMA.

FLASH-LIGHT-BATTERY TESTER.

1,316,393.　　　　　Specification of Letters Patent.　　Patented Sept. 16, 1919.

Application filed January 30, 1919. Serial No. 273,980.

*To all whom it may concern:*

Be it known that I, ROBERT MARVIN SCHOPPERT, a citizen of the United States of America, residing at Eutaw, in the county of Greene and State of Alabama, have invented certain new and useful Improvements in Flash-Light-Battery Testers, of which the following is a specification.

My invention relates to flash light battery testers and has for its object to produce a simple and inexpensive testing device which will function reliably and which will insure the right circuit connections being used for testing the batteries with lamps of the proper voltage.

At present, loose wire systems are customarily used for testing the flash light batteries and when properly and carefully handled they are serviceable, nevertheless it has been found in practice that often the wrong circuits are used for testing batteries of higher voltage than the lamp in the circuit therewith with the result that the test lamp is being constantly burned out. Moreover, these testers are not adapted for insuring the battery units in the higher voltage multiple cell batteries being held in proper contact in their tube or container during testing and this necessitates the operator holding the cells together while making the test.

My object is to design a tester which is provided with a series of separate contacts suitably spaced for each type of battery, these contacts having respective circuits to display lamps of the proper voltage for the battery with which they are intended to be used.

A further object is to design the tester so that the battery can be handled in one hand to make the test, the tester itself insuring the battery units being held in proper contact. My tester moreover is adapted for testing batteries through the sealed cartons or containers in which they are now customarily shipped, and is also adapted for testing the flash light lamps, in which case the proper battery is mounted between its contacts and its respective test lamp removed so that the lamp to be tested can be placed in its socket.

My invention also comprises the novel details of construction and arrangements of parts which in their preferred embodiment only are illustrated in the accompanying drawings which form a part of this specification, and in which:—

Figure 1 presents a front elevation of my battery tester showing one battery in testing position.

Fig. 2 is a side elevation of Fig. 1 partly broken away to illustrate the contact engaging the lamp base.

Fig. 3 is a rear view of the tester showing the circuit connections.

Similar reference numerals refer to similar parts throughout the drawings.

As illustrated, my invention is shown mounted on a suitable board or backing 1 of wood or other insulating material and attached near the upper end thereof is a transverse metallic contact plate 2 provided with a series of reflectors 3 terminating at their bases in lamp sockets for the reception of the test lamps 4, 5 and 6, which are resepectively of high, medium and low voltage. Below the contact plate 2 is arranged a transverse metallic plate 7 which forms the common ground for one end of all of the lighting circuits hereinafter described. This plate 7 is formed preferably of bent metal having an overhanging top flange 8 in which is rigidly mounted three pointed metallic tips 9, each of which is disposed under its respective test lamp. The end edges 10 of the ground plate 7 are also bent up to form end stops. On the lower portion of the base 1 I mount a series of spring contact members which being similar only one will be described. These spring contacts comprise each a base plate 11 formed of metal having its ends bent outwardly into parallelism and provided with alining guide holes to form guides 11ª for the contact plunger 12 which is intended to slide vertically, as illustrated, therethrough responsive to the action of a coil spring 13 which surrounds the plunger between the guides and is seated at its lower end on the bottom guide and bears at its upper end against the enlarged plunger head 14 which works through the upper guide. A nut 15 is screwed onto the lower threaded end of the plunger below the bottom guide and limits its upward travel responsive to the spring. One of these spring contacts is arranged in alinement with its respective tip 9 and lamp socket, but it will be noted that the contacts 9 and 14 for the higher voltage lamp 4 are spaced farthest apart and that the other two pairs of contacts for the lamps 5 and 6 are spaced more closely together. This spacing of the units of each pair of contacts is arranged so that the standard length of flash light batteries can only be tested in their proper circuits. For instance, a round cell battery of 2.7 volts will fit only between the contacts controlling the lamp 6 and it cannot be tested at any other point. A similar 2.9 volt battery being larger can be tested only between the contacts controlling the lamp 5, and a 3.8 volt battery can only be tested between the contacts controlling the lamp 4.

In order to make provision for the testing of flat or pocket type batteries, I provide additional pairs of contact plates 16 and 17 for the 3.8 volt cell and 18 and 19 for the 2.5 volt cell. In the manner hereinafter described the contacts 16 and 17 are in circuit with the test lamp 4 and the contacts 18 and 19 are in circuit with the test lamp 6. It is to be understood however that I have thus described the batteries for purposes of illustration only as my invention can be adapted for use with any type of batteries and of any voltage which it may be desired to test.

The circuit connections can be traced more readily from Fig. 3, where it will be seen that one of the screws 20 connecting the spring contact 11 for the test lamp 4 serves as a terminal for connection with a wire 21 leading to a spring contact plate 22 seated in a recess or seat 23 in the back of the board 1. The free end of this spring contact plate 22 is adapted to be engaged by and to maintain contact with the base of the test lamp 4, which is thus adapted to be connected through the plate 11 and spring contact plunger 14 with one pole of the battery cell. The circuit returns from the lamp 4 through the contact plate 2 and by a wire 24 is conducted to the ground plate 7 and thence by a tip 9 to the other pole of the battery under test. In like manner the base of the lamp 5 is connected through its respective spring contact 22ᵃ, similar to 22, to a wire 21ᵃ leading to a terminal screw 20ᵃ connected through its respective spring contact with one pole of the battery under test, the circuit to the other pole of the battery being completed through wire 24, plate 7 and a tip 9 in the manner already described. The base of the test lamp 6 is connected through its respective spring contact 22ᵇ by means of a wire 21ᵇ and terminal screw 20ᵇ to its respective spring contact, while the circuit is completed through plate 2, wire 24 and ground plate 7. The contact 16 is connected by a wire 25 with the wire 24 leading to the ground plate 7 and the contact 17, which has an upturned flange, is connected by a wire 26 with the wire 21. The contact 18 is connected by a wire 27 with the wire 25 leading to the ground plate 7 and the contact 19, which has an upturned flange, is connected by a wire 28 with the wire 21ᵇ leading to the lamp 6.

In operation, for the round cell type, the testing is conducted by taking the cell in one hand, pressing one end firmly down on the plunger of the properly spaced contacts 9 and 14 and bringing its other end into position under the proper tip 9, whereupon the pressure of the spring 13 on the plunger 14 will not only hold the battery in testing position, should the hand be removed, but will also hold the several units of the battery in proper contact and the circuits will be completed in the manner described and the lamp in its respective test circuit will flash. For pocket cell types the two contacts at one end of the cell are caused to engage the contact 16, 17; or 18, 19, according to the size of the cell, and in doing so they will flash the lamps 4 or 6 as the case may be. The flanged contacts 17 and 19 are suited for engaging the elongated overhung spring terminal of the battery.

Obviously, my invention is also adapted for the testing of the flash lamp bulbs, as by mounting a battery in place between the proper contacts 9 and 14 and the bulb to be tested can be screwed into the proper socket in the contact plate 2, the test bulb having been removed therefrom.

This invention is not intended to be restricted in scope to the specific embodiments shown, but contemplates such modifications as come within the spirit and scope of the claims.

Having thus described my invention, what I claim as new and desire to secure by Letters Patent, is:—

1. A flash light battery tester comprising a base, a plurality of test lamps of different voltage mounted therein, a pair of battery engaging contacts in circuit with each lamp, the units of each pair of contacts being differently spaced, and one unit comprising a U-shaped terminal having a spring-pressed contact plunger guided by and projecting through its arms, a spring bearing at one end on the terminal and at the other end on the plunger, and means to limit the plunger to a short movement about the terminal.

2. A flesh light battery tester comprising a plurality of pairs of contacts, a backing on which said contacts are mounted, spring means to urge the units of each pair of contacts together, and a lamp socket in circuit with each pair of contacts, the contacts of each pair being spaced to receive only a predetermined size of battery, and one unit comprising a U-shaped terminal having a spring-pressed contact plunger guided by and projecting through its arms, a spring bearing at one end on the terminal and at the other end on the plunger, and means to limit the plunger to a short movement about the terminal.

3. In a flash light battery tester, a board, a plurality of pairs of contacts arranged thereon, each pair of contacts comprising a fixed terminal and a yielding terminal formed by a spring-pressed plunger and its supporting guide, stop means to allow the plunger just enough play for the insertion of its respective size of battery between it and its opposite fixed terminal, each pair of terminals being spaced to receive a battery of a predetermined size only, a lamp socket in series with each pair of terminals and adapted to receive a lamp of suitable voltage for the battery that can be tested between its respective pair of terminals.

4. A battery tester comprising a series of lamp sockets, a ground plate connected to the several sockets and comprising an overhung flange with pointed tips therein, a yielding contact in line with each spring tip, and circuit connections therefrom to the base of the lamp in its respective lamp socket.

5. A flash light tester comprising, in combination, a base board, a contact plate thereon provided with a series of lamp sockets, a ground plate on said board electrically connected with said contact plate and comprising an overhanging flange with pointed contact tips, a spring contact plate mounted on said board under each lamp socket and adapted to be engaged by the base of a lamp therein, and a spring contact electrically connected to its respective contact plate and mounted on said board in alinement with one of said tips, said spring contacts being spaced at different distances from said ground plate and each comprising a U-shaped frame, a plunger longitudinally movable therein, and spring means to urge said plunger toward its respective coöperating tip to press and hold a battery in position between them, substantially as described.

In testimony whereof I affix my signature.

ROBERT M. SCHOPPERT.

Witness:
NOMIE WELSH.

Copies of this patent may be obtained for five cents each, by addressing the "Commissioner of Patents, Washington, D. C."